(12) United States Patent
Song et al.

(10) Patent No.: US 10,587,815 B2
(45) Date of Patent: Mar. 10, 2020

(54) IMAGE CAPTURING DEVICE AND METHOD OF DRIVING THE SAME

(71) Applicant: SAMSUNG ELECTRONICS CO., LTD., Suwon-si, Gyeonggi-Do (KR)

(72) Inventors: Il Seuk Song, Seoul (KR); Hyun Cheol Kim, Daegu (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 34 days.

(21) Appl. No.: 15/857,978

(22) Filed: Dec. 29, 2017

(65) Prior Publication Data

US 2018/0191934 A1  Jul. 5, 2018

(30) Foreign Application Priority Data

Dec. 30, 2016 (KR) .................. 10-2016-0184268

(51) Int. Cl.
*H04N 5/235* (2006.01)
*H04N 5/232* (2006.01)

(52) U.S. Cl.
CPC ......... *H04N 5/2353* (2013.01); *H04N 5/2351* (2013.01); *H04N 5/23212* (2013.01)

(58) Field of Classification Search
CPC .............. H04N 5/2353; H04N 5/2351; H04N 5/23212; H04N 5/33; H04N 5/40; H04N 5/353; H04N 5/3535; H04N 5/3745; H04N 5/2355; H04N 5/23254; H04N 5/23267; H04N 5/243; H04N 5/2352; H04N 9/735; H04N 2007/145; H04N 1/4074; G06T 5/40; G06T 5/0048; G06T 2207/20072; G06T 2207/10048; G06T 7/194; G06T 2207/10016; G06T 2207/10024;
(Continued)

(56) References Cited

U.S. PATENT DOCUMENTS 7,003,153 B1   2/2006  Kerofsky
7,251,056 B2   7/2007  Matsushima
7,538,801 B2   5/2009  Hu et al.
(Continued)

FOREIGN PATENT DOCUMENTS

EP        2946249        11/2015
KR    10-2013-0017750     2/2013
(Continued)

*Primary Examiner* — Pritham D Prabhakher
(74) *Attorney, Agent, or Firm* — F. Chau & Associates, LLC

(57) ABSTRACT

An Image capturing device and a method of driving the image capturing device are provided. The image capturing device includes an image sensor configured to generate a target image based on a predetermined first exposure target value. An image signal processor generates a second exposure target value based on brightness information of the acquired target image to control the image sensor, wherein the image signal processor includes a histogram generation circuit configured to create a luma histogram based on the brightness information of the acquired target image, a calculation circuit configured to calculate a distribution of the luma histogram, and an exposure target control circuit configured to generate the second exposure target value based on the distribution of the luma histogram to provide the second exposure target value to the image sensor.

20 Claims, 14 Drawing Sheets

(58) Field of Classification Search
CPC .......... G06T 2207/20008; G03B 7/093; G06K 9/00664; G06K 2209/27
USPC ........................................................ 348/362
See application file for complete search history.

(56) References Cited

U.S. PATENT DOCUMENTS

| | | | |
|---|---|---|---|
| 7,668,369 B2 | 2/2010 | Yen et al. | |
| 8,339,506 B2* | 12/2012 | Hung | H04N 5/23219 348/363 |
| 8,384,801 B2 | 2/2013 | Hung et al. | |
| 8,525,900 B2* | 9/2013 | Garten | G06F 3/1454 348/229.1 |
| 8,570,396 B2* | 10/2013 | Rapaport | G06F 3/1454 348/229.1 |
| 8,947,555 B2 | 2/2015 | Velarde et al. | |
| 8,970,731 B2 | 3/2015 | Song | |
| 9,179,080 B2* | 11/2015 | Sharma | H04N 5/3537 |
| 9,536,290 B2* | 1/2017 | Johnson | H04N 5/232 |
| 9,536,292 B2 | 1/2017 | Afrooze et al. | |
| 2008/0298723 A1* | 12/2008 | Hasegawa | G06T 1/60 382/305 |
| 2010/0271507 A1* | 10/2010 | Hung | H04N 5/23219 348/231.99 |
| 2011/0211732 A1* | 9/2011 | Rapaport | G06F 3/1454 382/107 |
| 2011/0254976 A1* | 10/2011 | Garten | G06F 3/1454 348/229.1 |
| 2012/0002898 A1* | 1/2012 | Cote | G06T 5/50 382/278 |
| 2013/0332866 A1* | 12/2013 | Johnson | H04N 5/232 715/764 |
| 2015/0195464 A1* | 7/2015 | Sharma | H04N 5/3537 348/217.1 |
| 2015/0379740 A1* | 12/2015 | Yang | G06T 5/50 348/222.1 |
| 2016/0142608 A1 | 5/2016 | Afrooze et al. | |
| 2016/0373667 A1* | 12/2016 | Kim | H04N 5/3532 |
| 2017/0171474 A1* | 6/2017 | Aota | H04N 5/2625 |
| 2017/0339409 A1* | 11/2017 | Socek | H04N 19/124 |
| 2017/0339417 A1* | 11/2017 | Puri | H04N 19/167 |

FOREIGN PATENT DOCUMENTS

| | | |
|---|---|---|
| KR | 10-2015-0139826 | 12/2015 |
| WO | 2014110654 | 7/2014 |

* cited by examiner

IMAGE CAPTURING DEVICE AND METHOD OF DRIVING THE SAME

CROSS-REFERENCE TO RELATED APPLICATIONS

This application claims the benefit of priority under 35 U.S.C. § 119 from Korean Patent Application No. 10-2016-0184268 filed on Dec. 30, 2016 in the Korean Intellectual Property Office, the contents of which are incorporated by reference herein.

1. TECHNICAL FIELD

The inventive concept relates to an image capturing device, and a method of driving the image capturing device. More particularly, the inventive concept relates to an image capturing device including an image signal processor that provides an exposure target value to an image sensor, and a method of driving the image capturing device.

2. DISCUSSION OF THE RELATED ART

An image capturing device can convert an optical image into an electric signal using an image sensor and output the electric signal in the form of a digital signal. Recent developments of the computer communications industries include employing image capturing devices in a variety of applications such as a digital camera, a camcorder, a cellular phone, a tablet PC, etc.

An image capturing device may conduct exposure control to acquire a target image of a subject at an appropriate luminance. Such exposure control may be conducted either by a user's input or controlled automatically as the image capturing device analyzes the acquired target image.

SUMMARY

The inventive concept provides an image capturing device automatically controlling an exposure target value of a target image based on the luma histogram of the target image.

The inventive concept also provides a method of driving an image capturing device automatically controlling an exposure target value of a target image based on the luma histogram of the target image.

The inventive concept will be understood and appreciated by a person of ordinary skill in the art upon review of the description herein below.

According to an embodiment of the inventive concept, an image sensor configured to generate a target image by converting an optical signal of an acquired image into an electrical signal; an image signal processor configured to: receive the target image generated by the image sensor, provide a predetermined first exposure target value to the image sensor, in which the generated target image is based on the predetermined first exposure target value, and generate a second exposure target value based on brightness information of the generated target image to control an output of the image sensor, wherein the image signal processor comprises: a histogram generation circuit configured to create a luma histogram based on the brightness information of the generated target image; a calculation circuit configured to calculate a distribution of the luma histogram; and an exposure target control circuit configured to generate the second exposure target value based on the distribution of the luma histogram to provide the second exposure target value to the image sensor.

According to an embodiment of the inventive concept, a method of driving an image capturing device includes acquiring a target image based on a predetermined first exposure target value, generating a luma histogram based on brightness information of the acquired target image, calculating a distribution of the luma histogram, and generating a second exposure target value based on the distribution of the luma histogram to control the image sensor.

The generating of a target image includes an image sensor converting an optical signal of an acquired image into an electrical signal.

According to an embodiment of the inventive concept, an image capturing device includes a lens that condenses incident light; an image sensor having a light-receiving region arranged to receive the incident light that passes through the lens, the image sensor generates a target image based on conversion of an optical signal of an acquired image into an electrical signal; a motor assembly configured to adjust the focus of the lens or perform shuttering in response to receiving a control signal CTRL, and an image signal processor configured to: receive the target image generated by the image sensor, provide a predetermined first exposure target value to the image sensor, in which the generated target image is based on the predetermined first exposure target value, and generate a new exposure target value based on brightness information of the generated target image to control the image sensor.

The histogram generation circuit may be configured to create a luma histogram based on the brightness information of the generated target image.

The distribution of the luma histogram may include normalized data of a variance of the luma histogram based on scene information of the target image.

The exposure target control circuit compares the normalized data with a reference value to modify a brightness of the target image.

The image sensor creates Red Green Blue (RGB) data and a Bayer pattern based on the incident light that passes through the lens.

The image sensor provides RGB data based on a clock signal CLK.

BRIEF DESCRIPTION OF THE DRAWINGS

The inventive concept will be more appreciated and understood by a person of ordinary skill in the art in accordance with one or more embodiments disclosed herein below with reference to the attached drawings, in which.

DETAILED DESCRIPTION

Hereinafter, an image capturing device and a method of operating the image capturing device according to exemplary embodiments of the inventive concept will be described with reference to FIGS. 1 to 11.

Figure 1:
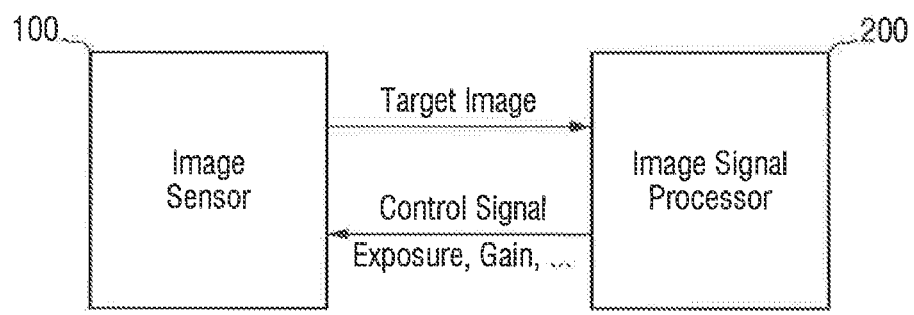
FIG. 1 is a block diagram of an image capturing device according to an embodiment of the inventive concept.

FIG. 1 is a block diagram of an image capturing device 1 according to an embodiment of the inventive concept.

Referring to FIG. 1, the image capturing device 1 according to an embodiment of the inventive concept may include an image sensor 100 and an image signal processor 200.

The image sensor 100 may receive a control signal from the image signal processor 200, and in response may generate a target image by converting an optical signal into a target image in the form of an electrical signal, and provides the target image to the image signal processor 200. The image sensor 100 may generate the target image based on, for example, an exposure target value in the control signal provided by the image signal processor 200. The configuration and operation of the image sensor 100 will be described in more detail with reference to FIG. 3.

The image signal processor 200 may provide a control signal to the image sensor 100 and may receive and process an image signal output from the image sensor 100. The image signal output from the image sensor may be the target image. The conversion of the optical signal into the target image may be based on certain control information provided by the image signal processor 200. For example, the control signal provided by the image signal processor 200 to the image sensor 100 may include, for example, an exposure control signal or a gain control signal.

The image signal processor 200 may generate a feedback signal for controlling the image sensor 100 by using the target image provided by the image sensor 100 and may provide the feedback signal to the image sensor 100. For example, the image signal processor may adjust the gain control signal or the exposure control signal based on the target image that is provided to the image signal processor. In some embodiments of the inventive concept, the feedback signal generated by the image signal processor 200 may be a newly-created exposure target value based on the target image previously provided by the image sensor 100.

Specifically, the image sensor 100 may generate a target image based on a predetermined exposure target value used when converting the optical signal into an electrical signal, and the image signal processor 200 may generate a new exposure target value based on brightness information of the generated target image to control the image sensor 100. For example, a feedback operation may be employed in which the image processor generates a new target exposure value based on analyzing the brightness information based on the target image provided from the image processor. The image signal processor 200 will be described in more detail below with reference to FIG. 2.

Figure 2:
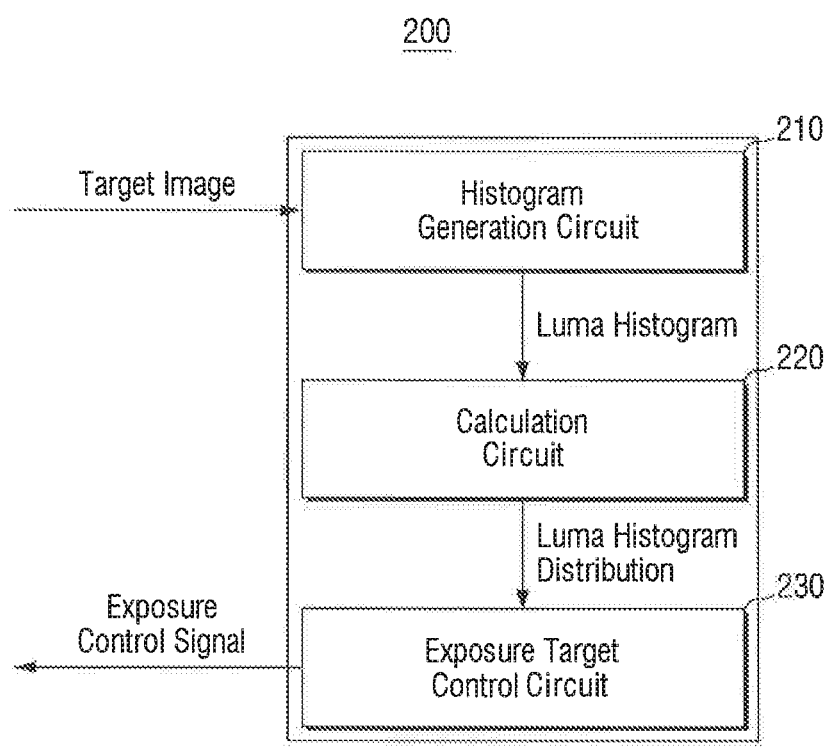
FIG. 2 is a block diagram of an image signal processor included in an image capturing device according to an embodiment of the inventive concept.

FIG. 2 is a block diagram of the image signal processor 200 included in the image capturing device 1 according to an embodiment of the inventive concept.

Referring now to FIG. 2, the image signal processor 200 may include a histogram generation circuit 210, a calculation circuit 220, and an exposure target control circuit 230.

The histogram generation circuit 210 may receive a target image generated by the image sensor 100 and may create a luma histogram of the target image. The luma histogram may represent, for example, a distribution of pixels included in the target image versus brightness, such as the histogram 10 shown in FIG. 6A.

With further regard to the image signal processor 200, the calculation circuit 220, for example, may calculate the distribution of the luma histogram based on the luma histogram created by the histogram generation circuit 210. The luma histogram may be calculated, for example, by calculating the distribution of the luma histogram based on the scene information included in the target image.

In some embodiments of the inventive concept, the distribution of the luma histogram calculated by the calculation circuit 220 may be the variance of the normalized the luma histogram.

Figure 6A:
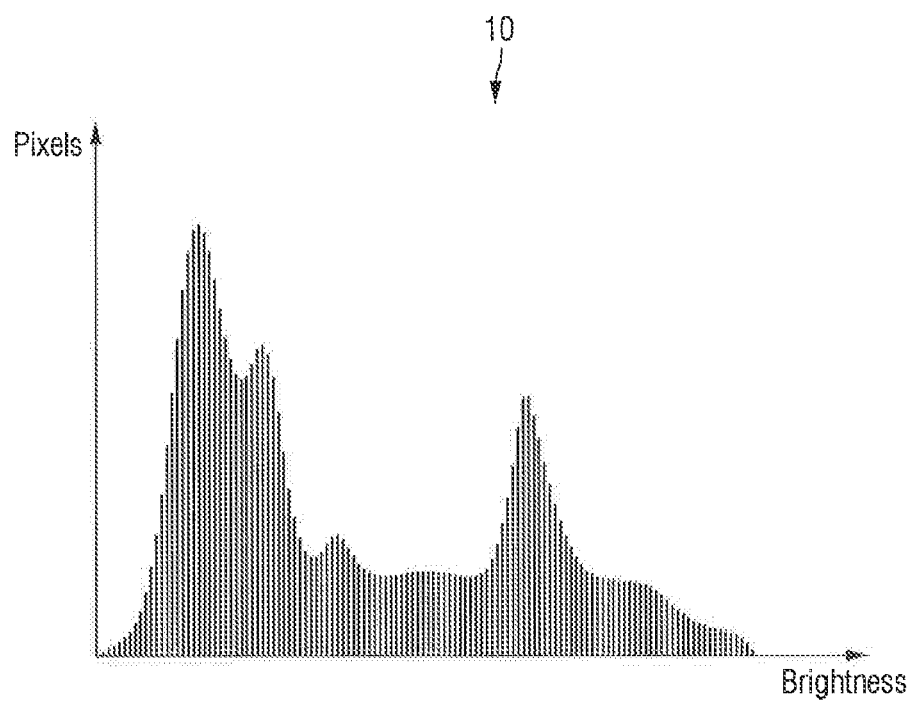
FIG. 6A is an example of a luma histogram created by the image capturing device according to an embodiment of the inventive concept.
Figure 6B:
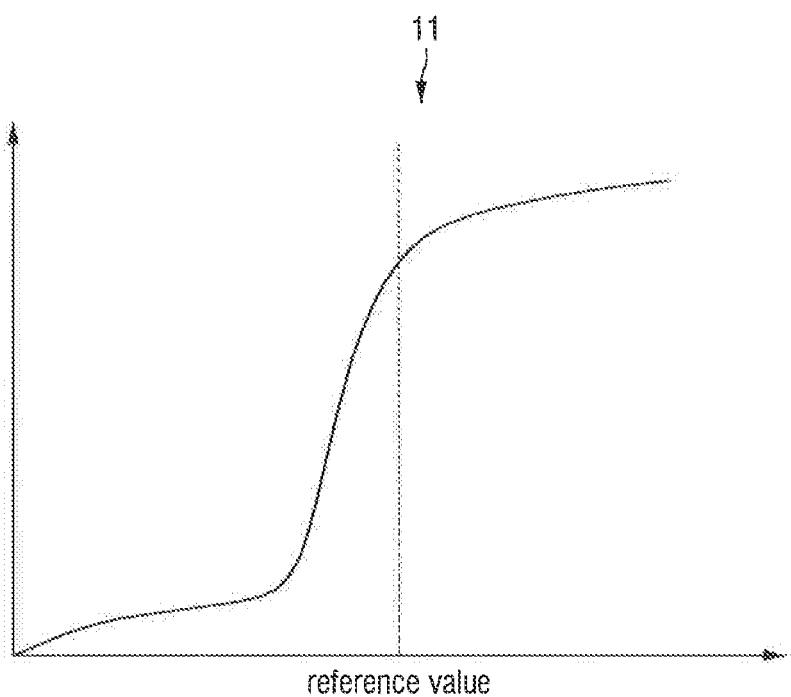
FIG. 6B is a graph showing the distribution of the luma histogram created by the image capturing device according to an embodiment of the inventive concept.

For example, the calculation circuit 220 may calculate the distribution of the luma histogram by normalizing the luma histogram of the target image using the scene information of the target image, for example, the average brightness of the pixels included in the target image. An example of a graph of a normalized luma histogram of the target image by the calculation circuit 220 is shown in FIG. 6B.

The exposure target control circuit 230 may generate a second exposure target value by using the distribution of the luma histogram provided by the calculation circuit 220.

Although the image capturing device 200 shown in FIG. 2 includes the histogram generation circuit 210, the calculation circuit 220, and the exposure target control circuit 230, the inventive concept is not limited thereto. The image sensor may have additional circuitry configured to perform other functions, or may be connected to other components that may process information that is in turn output to the image processor for additional operations to be executed b the image signal processor.

For example, with regard to the image capturing device 200, the image data of the target image generated and provided by the image sensor 100 may pass through another function block prior to being provided to the histogram generation circuit 210. In addition, a new exposure target value generated by the exposure target control circuit 230 may pass through another function block prior to being provided to the image sensor 100.

Figure 3:
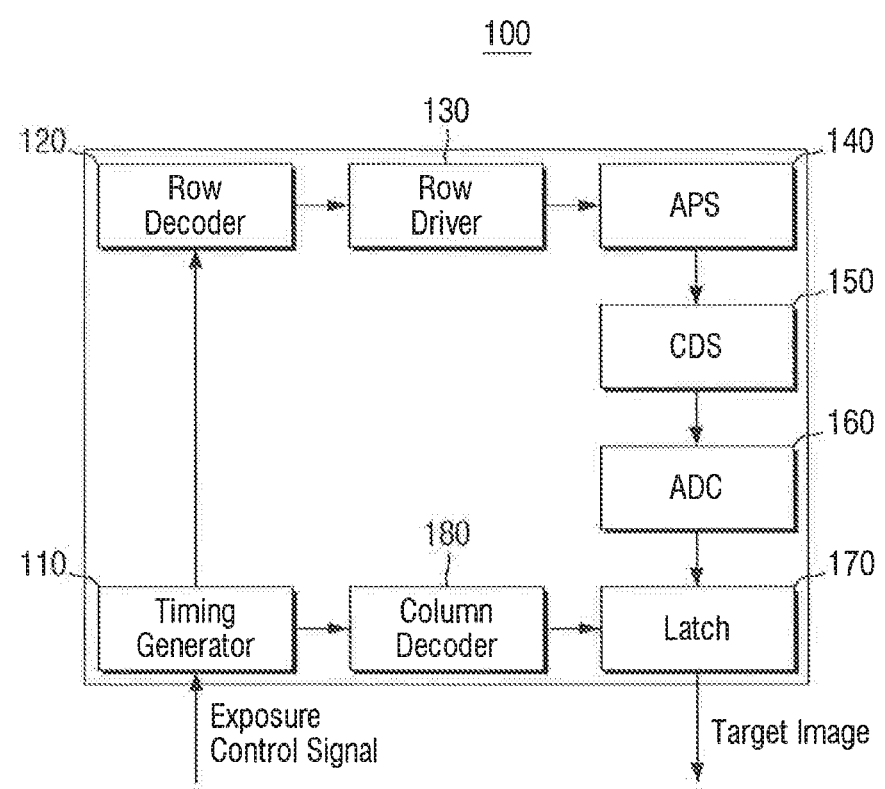
FIG. 3 is a block diagram of an image sensor included in an image capturing device according to an embodiment of the inventive concept.

FIG. 3 is a block diagram of the image sensor 100 included in the image capturing device 1 according to an embodiment of the inventive concept.

Referring to FIG. 3, the image sensor 100 included in the image capturing device 1 according to the inventive concept may include a timing signal generator 110, a row decoder 120, a row driver 130, an active pixel sensor (APS) array 140, a correlated double sampler (CDS) 150, an analog-to-digital converter (ADC) 160, a latch 170, a column decoder 180, etc. A person of ordinary skill in the art should understand and appreciate that an image sensor according to the inventive concept is not limited to the configuration shown in FIG. 3 and may have fewer or additional components.

The timing signal generator 110 may provide a clock signal, a timing control signal and a control signal utilized for the operations performed by the row decoder 120 and the column decoder 180, to the row decoder 120 and the column decoder 180. In the image capturing device 1 (shown in FIG. 1) according to an exemplary embodiment of the inventive concept, the timing signal generator 110 generates a timing control signal using an exposure target value provided by an exposure control signal from the image signal processor 200, and supplies a timing control signal to the row decoder 120 and the column decoder 180.

The timing signal generator 110 may include, for example, a logic control circuit, a phase locked loop (PLL) circuit, a timing control circuit, a communications interface circuit, etc. The aforementioned components may be part of an integrated circuit.

The row decoder 120 selects a row selection line from among the row selection lines of the APS array 140 in response to receiving the timing signal and the control signal supplied from the timing signal generator 110.

The row driver 130 may provide driving signals for driving the plurality of unit pixels for the selected row selection lines of the active pixel sensor array 140 in response to the decoding by the row decoder 120. Typically, when the unit pixels are arranged in a matrix, the driving signals may be provided on a row-by-row basis.

The APS array 140 may include a plurality of unit pixels arranged in two-dimensions. The plurality of unit pixels may include photosensors and an active amplifier, and may serve to convert the optical images into electrical output signals. The APS array 140 may be driven by receiving driving signals such as a row selection signal, a reset signal, and a charge transfer signal from the row driver 130. In addition, the converted electrical output signals may be provided to the correlated double sampler 150 via a vertical signal line. The APS array 140 may include image pixels utilizing CMOS.

With continued reference to FIG. 3, the correlated double sampler 150 may receive the output signal provided from the APS array 140 via the vertical signal line and hold and sample it. For example, the correlated double sampler (CDS) 150 may perform sampling by taking two samples of a certain noise level and the signal level of the output signal from the APS, and output a difference level corresponding to the difference between the noise level and the signal level.

The analog-to-digital converter (ADC) 160 may, for example, convert an analog signal corresponding to the difference level output from the CDS 150 into a digital signal and output the digital signal.

The latch 170 may, for example, latch the digital signal output from the analog-to-digital converter 160. The latch 170 may sequentially transmit the latched signal to the image signal processor 200 in response to the decoding by the column decoder 180.

Figure 4:
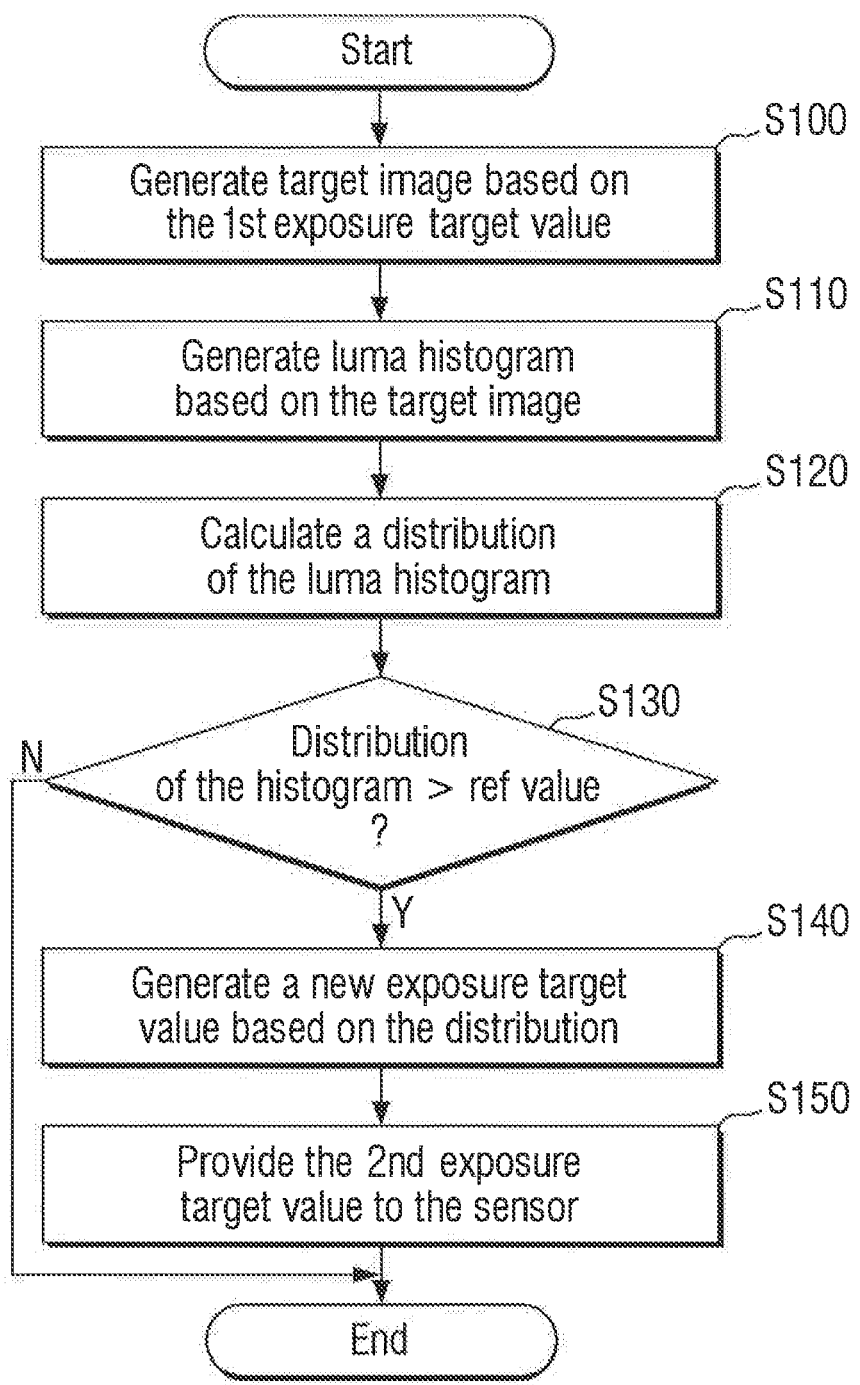
FIG. 4 is a flowchart illustrating an operation of an image capturing device according to an embodiment of the inventive concept.

FIG. 4 is a flowchart for illustrating an operation of the image capturing device 1 according to an embodiment of the inventive concept.

Referring to FIG. 4, at operation (S100), the image capturing device 1 according to an exemplary embodiment of the inventive concept may generate a target image based on a first exposure target value provided by the image signal processor.

At operation (S110) a luma histogram is generated based on brightness information of the generated target image. The histogram generation circuit may create a representation of, for example, a distribution of pixels included in the target image versus brightness, as discussed herein above.

At operation (S120), a distribution of the luma histogram is calculated. The luma histogram may be the result of a distribution calculation based on the scene information included in the target image, as discussed herein above.

At operation (S130), there is a determination as to whether the distribution of the histogram is larger than a reference value.

If at operation (S130), the distribution of the histogram is larger than a reference value, then at operation (S140) a new exposure target value may be generated. At operation (S150), the generated exposure target value is provided to the image sensor 110.

However, if at operation (S130) it is determined that the distribution of the histogram is not larger than the reference value, the process ends.

More specifically, at operation (S100) the image capturing device 1 generates a target image based on a predetermined first exposure target value. The image sensor 100 may generate the target image by converting an optical signal to an electrical signal based on the predetermined first exposure target value provided by the image signal processor. The target image may be generated by providing a control signal including the first exposure target value from the image signal processor 200 to the image sensor 100, and the image signal processor receives the target image from the image sensor 100 based on the control signal including the first exposure target value.

The timing signal generator 110 included in the image sensor 100 may generate a timing control signal and a control signal for controlling the row decoder 120 and the column decoder 180 using the first exposure target value. FIG. 3 shows an example of an image sensor in which the timing generator receives a control signal with an exposure target value.

The timing control signal and the control signal generated by the timing signal generator 110 using the first exposure target value may be used, for example, to control the timing at which the APS array 140 is reset and exposed by an electronic shutter. By controlling the timing of the APS being reset and exposed by an electronic shutter, the timing signal generator 110 may control the time taken (e.g. time allotted) to accumulate charges in the photo diode included in each pixel of the APS array 140. As the timing signal generator increases the time allotted to accumulate charges in the photodiode, (e.g., the exposure time), the brightness of the target image generated by the image sensor 100 may increase.

The image sensor 100 may generate a target image based on the timing control signal and the control signal, and may provide the target image to the image signal processor 200.

Referring back to FIG. 4, after the target image being generate and provided to the image signal processor, at operation (S110), the image signal processor 200 generates the luma histogram 10 of the target image based on the brightness information of the target image. Specifically, the histogram generation circuit 210 of the image signal processor 200 may generate the luma histogram 10 of the target image based on the brightness information of the target image. An example of the luma histogram 10 of the target image generated by the histogram generation circuit 210 is shown in FIG. 6A. As shown in FIG. 6A, the luma histogram 10 represents the distribution of the pixels included in the target image versus brightness.

Referring back to the flowchart of FIG. 4, at operation (S120), the image signal processor 200 calculates the distribution of the luma histogram.

In some embodiments of the inventive concept, the distribution of the luma histogram may be obtained by normalizing the variance of the luma histogram 10 of the target image generated by the histogram generation circuit 210 in the previous step.

The operation of calculating the distribution of the luma histogram by calculation circuit 220 and normalizing the variance will be described in detail below with reference to FIG. 5.

Figure 5:
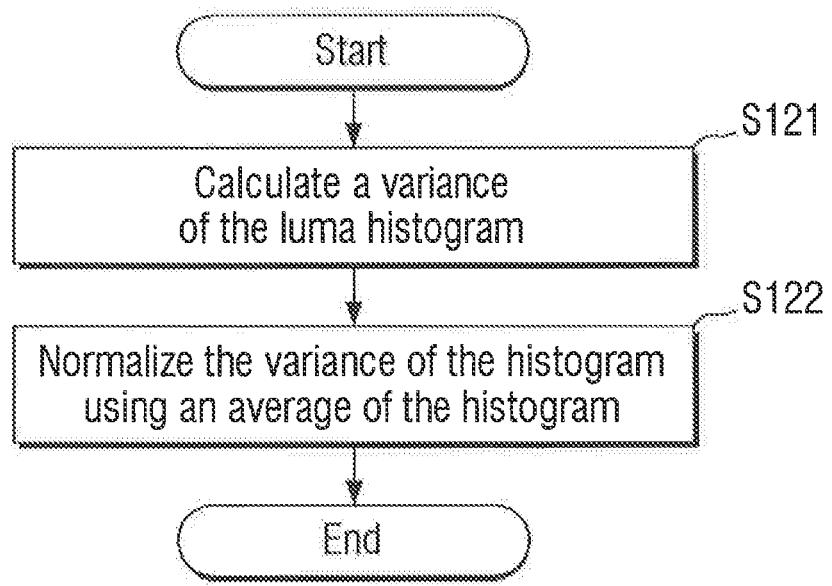
FIG. 5 is another flowchart illustrating an operation of an image capturing device according to an embodiment of the inventive concept.

FIG. 5 is a flowchart illustrating an operation of the image capturing device 1 according to an embodiment of the inventive concept.

Referring to FIG. 5, at operation (S121), the calculation circuit 220 calculates the distribution of the luma histogram 10 by calculating the variance of the luma histogram 10 of the target image, and at operation (S122) normalizing the variance of the luma histogram 10 by using average brightness of the luma histogram.

More particularly, the calculation circuit 220 may calculate the distribution of the luma histogram 10, for example, the variance of the brightness of the pixels shown in the luma histogram 10. Subsequently, the calculation circuit 220 may normalize the variance of the luma histogram 10 using the scene information of the target image, for example, the average brightness of all the pixels included in the target image.

An example of the normalized luma histogram 10 of the target image is shown in the graph of FIG. 6B.

More particularly, FIG. 6A is an example of the luma histogram created by the image capturing device according to an embodiment of the inventive concept. FIG. 6B is a graph showing the distribution of the luma histogram created by the image capturing device according to the exemplary embodiment of the inventive concept.

Referring to FIGS. 6A and 6B, FIG. 6A shows an exemplary luma histogram 10 created by the histogram generation circuit 210, and FIG. 6B shows a graph 11 of the normalized luma histogram 10 by using the scene information of a target image, e.g., the average brightness of all the pixels included in the target image by the calculation circuit 220. Referring to FIG. 6B, a reference value is shown that is used by the exposure target control circuit 230 to compare the normalized graph 11 to generate a new exposure target value, as described below.

Referring back to FIG. 4, at operation (S130) it is determined whether the distribution of the histogram is larger than a reference value. In this example, it is determined that the distribution of the histogram is larger than the reference value.

Accordingly, at operation (S140), the exposure target control circuit 230 generates a new exposure target value using the distribution of the luma histogram 10.

The generating of the new exposure target value by using the distribution of the luma histogram 10 by the exposure target control circuit 230 may include comparing the graph 11, in which the variance of the luma histogram 110 shown in FIG. 6B is normalized with the average brightness of all the pixels of the target image, with the reference value. It can be determined whether the distribution of the histogram is larger than the reference value.

In some embodiments of the inventive concept, the exposure target control circuit 230 may generate a second exposure target value that is greater than the first exposure target value if the normalized graph 11 exhibits a smaller distribution as compared to the reference value. On the other hand, the exposure target control circuit 230 may generate a second exposure target value equal to the first exposure target value if the normalized graph 11 has a larger distribution as compared with the reference value.

Subsequently, at operation (S150) the newly determined second exposure target value is provided to the image sensor 100. The image sensor 100 controls the timing signal generator 110 with the received second exposure target value. The timing signal generator 110 generates a timing control signal based on the exposure time determined based on the second exposure target value, and provides the timing control signal and the control signal to the row decoder 120 and the column decoder 180.

According to the inventive concept, the APS array 140 may convert an optical image into an electrical signal based on the timing control signal and the control signal. The latch 170 may provide a new target image to the image signal processor 200.

The image capturing device 1 according to an exemplary embodiment of the inventive concept uses the distribution of the luma histogram 10 of the target image to capture a newly received target image with a new exposure target value. More specifically, the exposure target control circuit 230 uses the average brightness of all the pixels included in the target image as a criterion for comparing the graph 11 obtained by normalizing the variance of the luma histogram 10.

If the normalized graph 11 has a smaller distribution as compared to the reference value, the brightness of all the pixels of the target image may have a relatively uniform distribution. The relatively uniform distribution may be interpreted as an indication that many achromatic or monochromatic color elements are distributed in the target image. If the target image contains many achromatic or monochromatic color elements, it is likely that the target image has been acquired with an exposure target value lower than a threshold exposure target value. When a target image is acquired with a relatively small exposure target value, a relatively dark target image may be generated.

According to an embodiment of the inventive concept, if a target image contains relatively many achromatic or monochromatic color elements, the image capturing device 1 may control the image sensor 100 with a second exposure target value that is larger than a predetermined first exposure target value. In the case where the second exposure target value is larger than the first exposure target value, the image sensor 100 may accumulate the charges in the photodiodes included in the respective pixels of the APS array 140 for a longer exposure time. As a result, if the target image contains relatively many achromatic or monochromatic color elements, the image signal processor 200 may control the image sensor 100 with the second exposure target value that is larger than the first exposure target value, such that the image sensor 100 may generate a relatively bright target image. Hereinafter, a target image created by the image sensor 100 based on the second exposure target value will be described in detail below with reference to FIGS. 7A and 7B.

Figure 7A:
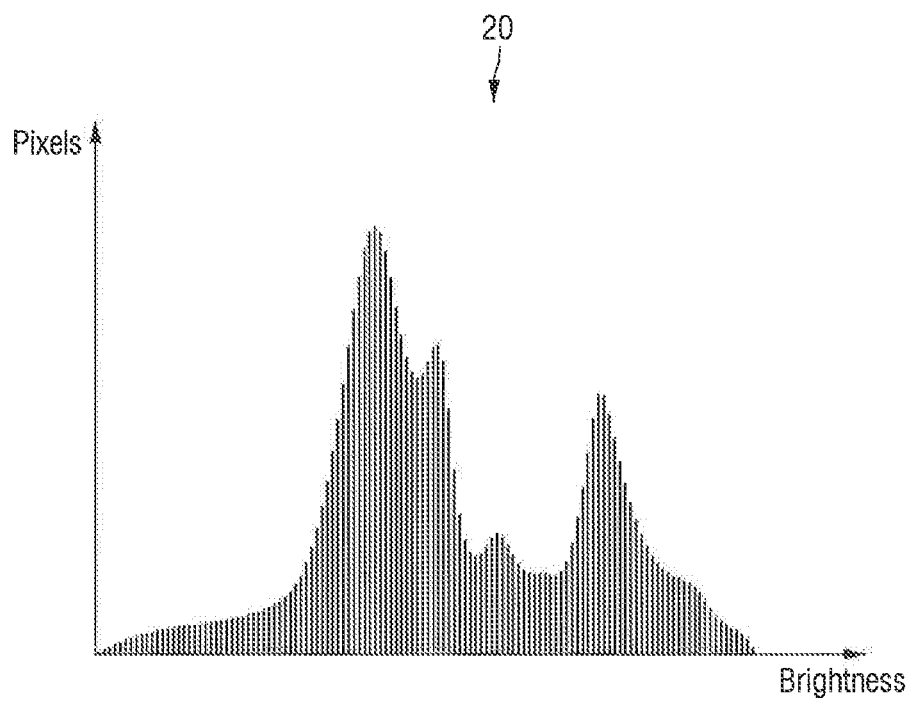
FIG. 7A is an exemplary luma histogram of a target image created by an image capturing device based on a new exposure target value according to an embodiment of the inventive concept.
Figure 7B:
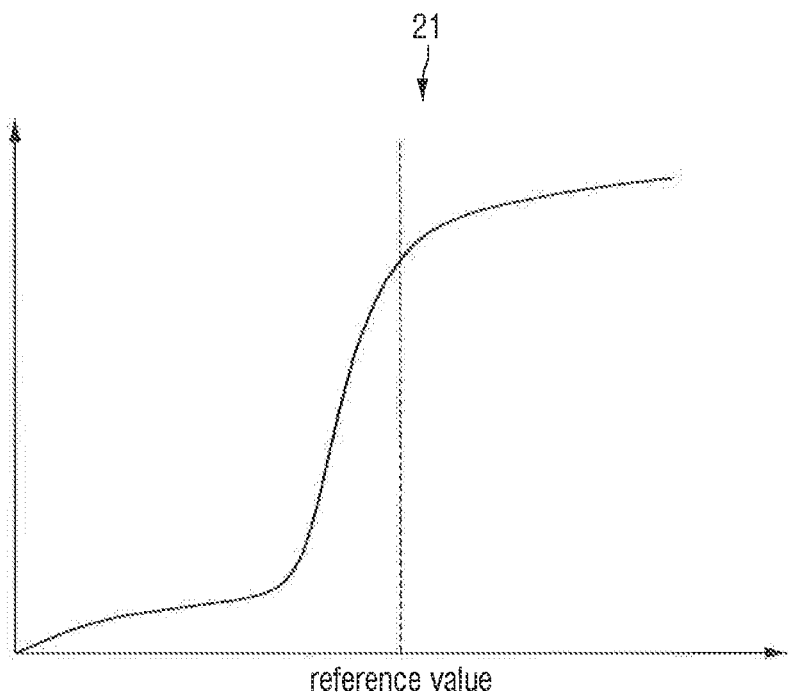
FIG. 7B is a graph showing the distribution of the luma histogram of the target image created by the image capturing device based on a new exposure target value according to an embodiment of the inventive concept.

FIG. 7A is an exemplary luma histogram of a target image created by an image capturing device based on a new exposure target value according to an embodiment of the inventive concept. FIG. 7B is a graph showing the distribution of the luma histogram of the target image created by the image capturing device based on a new exposure target value according to the exemplary embodiment of the inventive concept.

FIG. 7A shows the luma histogram 20 of a target image that is created by the image sensor 100 based on the second exposure target value, which is larger than the first exposure target value, created by and provided from the image signal processor 200. FIG. 7B shows its distribution 21.

In some embodiments of the present disclosure, the distribution 21 of the luma histogram 20 of the target image shown in FIG. 7B may be obtained by normalizing the luma histogram 20 with the average brightness of all the pixels included in the target image, like the graph shown in FIG. 6B.

A person of ordinary skill in the art can see from FIG. 7A that, in the target image newly created by the image sensor 100 based on the second exposure target value, the brightness distribution of all the pixels of the luma histogram 20 has been shifted toward the brighter side, when compared with, for example, the luma histogram 10 of FIG. 6A.

On the other hand, a person of ordinary skill in the art can see from FIG. 7B that the graph 21 obtained by normalizing the new target image with the average of all the pixels included in the target image is substantially identical to the graph 11 of FIG. 6B despite the changed exposure target value.

In addition, the image signal processor 200 included in the image capturing device according to some embodiments of the inventive concept utilizes the graph 11 obtained by normalizing the luma histogram 10 of the target image with the average brightness of all the pixels included in the target image, instead of using the luma histogram 10 of the target image as a criterion for determining the second exposure target value.

If a new second exposure target value is determined based on the luma histogram 10 of FIG. 6A, the new luma histogram 20 shifts to the brighter side and thus is not identical to the previous luma histogram 10, as shown in FIG. 7A.

In contrast, in the image capturing device 1 according to the inventive concept, a new second exposure target value is determined based on the normalized graph 11 of the luma histogram of the target image, such that the normalized graph 21 of the luma histogram obtained from the new target image acquired based on the second exposure target value may be substantially identical to the normalized graph 11 of the luma histogram of the previous target image. The reason for the substantially identical histograms is, for example, because the distribution of the luma histogram, specifically, the graph 21 normalized with the average brightness of all the pixels included in the target image shown in FIG. 7B is identical to that of the previous target image, unless there is a change in the subject, e.g., a scene change in the target image.

If the exposure target control circuit 230 determines the exposure target value by comparing the luma histograms 10 and 20 of the target image with an arbitrary reference value, the luma histogram 20 of the new target image acquired using the second exposure target value may be changed. As a result, the exposure target control circuit 230 may have to perform an additional process of comparing the changed luma histogram 20 with a reference value to determine another exposure target value.

As described above, the exposure target control circuit 230 of the image capturing device 1 according to an embodiment of the inventive concept may use the normalized graphs 11 and 21 of the luma histograms to control the exposure target value. Even though the normalized graph 21 of the luma histogram is acquired using the changed second exposure target value, it may be identical to the previous graph 11. Thus, the additional process of determining another exposure target value by comparing the changed luma histogram with a reference value to determined another exposure target value does not have to be performed.

In some embodiments of the inventive concept, the luma histogram 10 may generate the second exposure target value by using other information, other than the above-described distribution of the luma histogram 10, as explained herein below.

The information (other than the above-described distribution of the luma histogram) may include, for example, the proportion of oversaturated pixels among all the pixels included in the target image, and the overall average brightness of the pixels of the target image. The exposure target control circuit 230 may apply different weights to the information and may generate a new exposure target value for controlling the exposure of the target image.

Specifically, if the portion of the oversaturated pixels of all the pixels is larger than a reference value, the exposure target control circuit 230 may generate a new exposure target value so as to decrease the exposure target value. In addition, if the overall brightness of all the pixels included in the target image is larger than a reference value, the exposure target control circuit 230 may generate a new exposure target value so as to decrease the exposure target value. In generating a new exposure target value, the exposure target control circuit 230 may apply different weights to different elements, for example, the proportion of oversaturated pixels or the overall average brightness.

Figure 8:
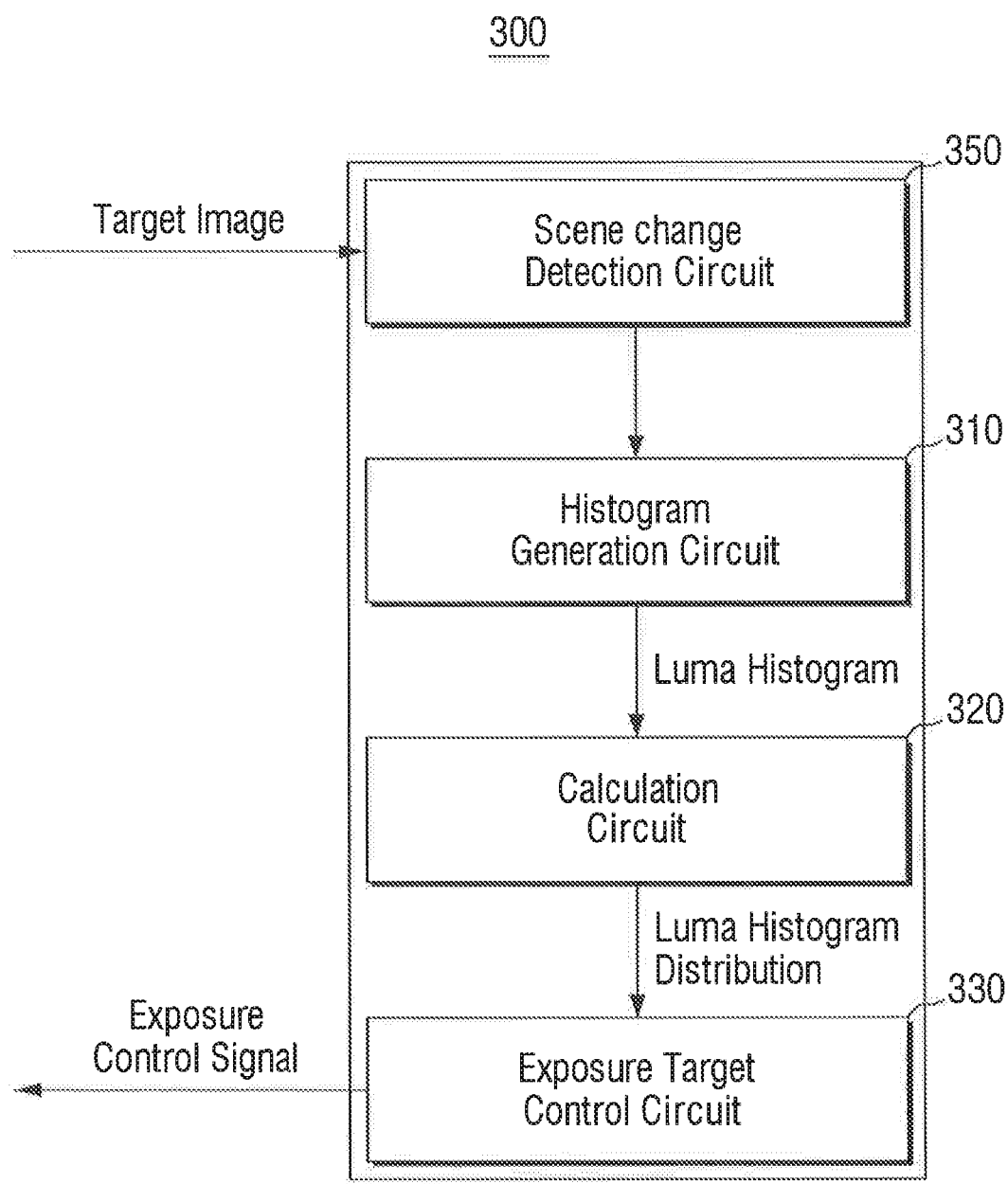
FIG. 8 is a block diagram of an image signal processor included in an image capturing device according to an embodiment of the inventive concept.

FIG. 8 is a block diagram of an image signal processor included in an image capturing device according to an embodiment of the inventive concept.

Referring to FIG. 8, an image signal processor 300 included in the image capturing device according to an embodiment of the inventive concept may further include a scene change detection circuit 350, in addition to a histogram generation circuit 310, a calculation circuit 320, and an exposure target control circuit 330, which are identical to those included in the image signal processor 200 included in the image capturing device according to the above exemplary embodiment of the inventive concept. Hereinafter, descriptions will be made focusing on differences from the above exemplary embodiment, and the redundant description will be omitted.

The scene change detection circuit 350 included in the image capturing device according to this an embodiment of the inventive concept may detect a scene change accompanying a change in a subject in a target image acquired by the image sensor 200. Such a scene change detected by the scene change detection circuit 350 will be described with reference to FIGS. 9A and 9B.

Figure 9A:
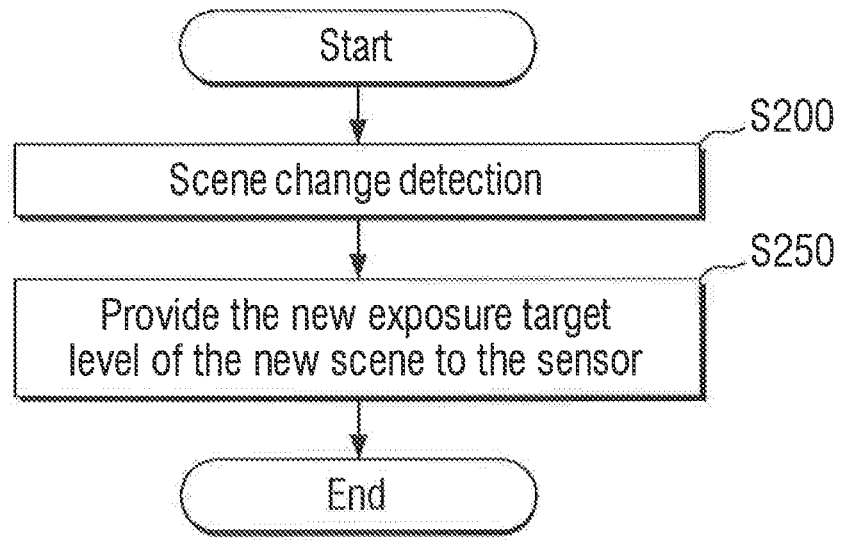
FIG. 9A is a flowchart illustrating an operation of an image capturing device according to an embodiment of the inventive concept.

FIG. 9A is a flowchart for illustrating an operation of the image signal processor 300 included in the image capturing device according to an embodiment of the inventive concept.

Referring to FIG. 9A, the image signal processor 300 detects a scene change by the scene change detection circuit 350 (S200), and provides the image sensor 100 with a newly created exposure target due to the scene change.

As described above, the image capturing device according to some embodiments of the inventive concept uses the graph 11 obtained by normalizing the luma histogram 10 of the target image with the average brightness of all the pixels included in the target image, instead of using the luma histogram 10 of the target image as a criterion for determining the second exposure target value. According to the inventive concept, no additional new exposure target value is determined after determining the second exposure target value unless there is a scene change in the target image.

Accordingly, when the scene change detection circuit 350 detects a scene change, the histogram generation circuit 310, the calculation circuit 320 and the exposure target control circuit 330 may determine a new exposure target value to be applied to a new target image.

Figure 9B:
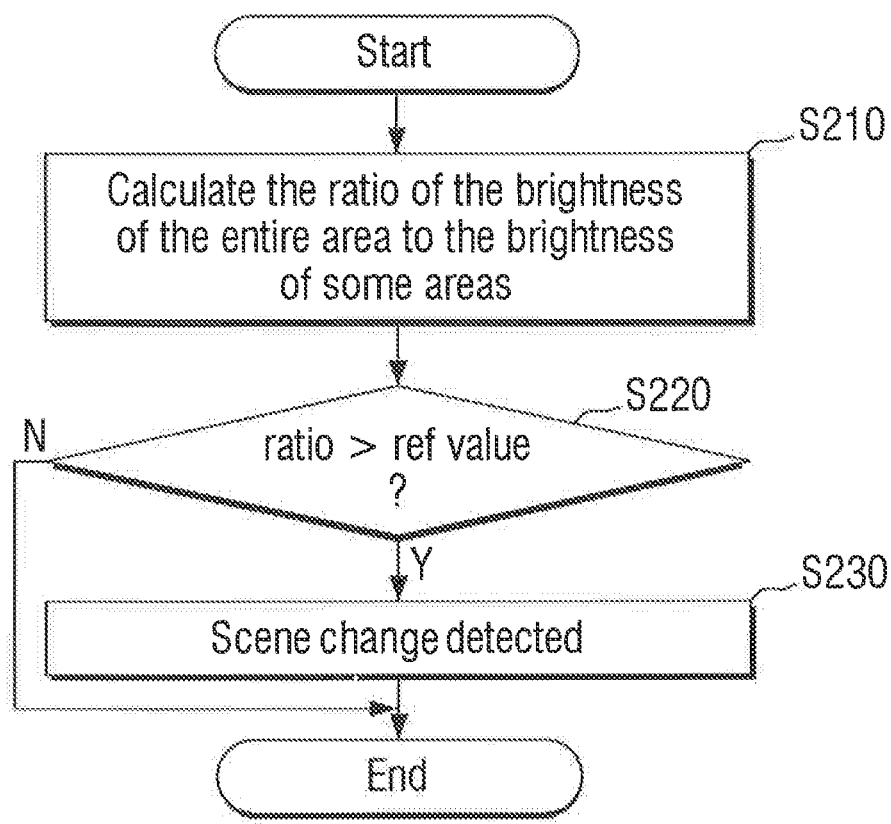
FIG. 9B is a flowchart illustrating an operation of an image capturing device according to an embodiment of the inventive concept.

FIG. 9B is a flowchart for illustrating an operation of an image capturing device according to an embodiment of the inventive concept.

Referring to FIG. 9B, the scene change detection circuit 350 included in the image capturing device according to this embodiment of the inventive concept calculates a ratio of a brightness change of some areas with respect to a brightness change of the entire area in a target image (S210), compares the ratio with a reference value (S220), and determines that there is a scene change if the ratio is greater than the reference value (S230). The scene change detection circuit may include, for example, a comparator, logic gates, etc. configured in an integrated circuit.

The scene change detection circuit 350 calculates a ratio of a brightness change of some areas with respect to a brightness change of the entire area of the target image. There may be more than one area to be compared with the entire area in the target image. If it is detected that the ratio of a brightness change of one or more areas with respect to a brightness change of the entire area of the target image is larger than a reference value, it may mean that there is a scene change in the areas. The scene change detection circuit 350 may detect such a scene change of the target image and may allow the histogram generation circuit 310 to create a luma histogram of a new target image.

However, the above-described operation of the scene change detection circuit 350 is an example, and the inventive concept is not limited to the description hereinabove. In another exemplary embodiment, the image capturing device may detect a scene change in a target image.

The calculation circuit 320 calculates the distribution of the luma histogram created by the histogram generation circuit 310. The exposure target control circuit 330 calculates a new exposure target value using the distribution of the luma histogram. In some embodiments of the inventive concept, the luma histogram may be obtained by normalizing the histogram of a new target image using the average brightness of all the pixels included in the target image, as described above with respect to the above exemplary embodiment.

Figure 10:
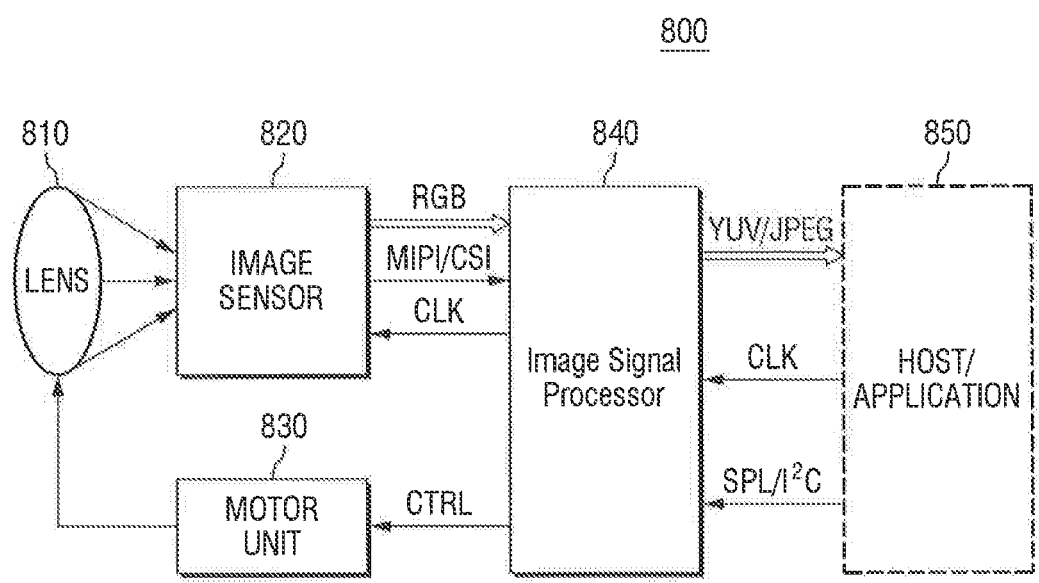
FIG. 10 is a block diagram of a digital camera including an image capturing device according to an embodiment of the inventive concept.

FIG. 10 is a block diagram of an electronic device including the image capturing device according to some exemplary embodiments of the inventive concept.

Referring to FIG. 10, an electronic device 800 may include a lens 810, an image sensor 820, a motor circuit 830, and an image signal processor 840. The image sensor 820 comprises an image sensor that acquires a target image based on the above-described exposure target value.

The lens 810 condenses incident light into a light-receiving region of the image sensor 820. The image sensor 820 may create RGB data RGB in a Bayer pattern based on the light coming through the lens 810. The image sensor 820 may provide RGB data RGB based on a clock signal CLK.

In some embodiments of the inventive concept, the image sensor 820 may interface with the image signal processor 840 via a mobile industry processor interface (MIPI) and/or a camera serial interface (CSI).

The motor circuit 830 may adjust the focus of the lens 810 or perform shuttering in response to a control signal CTRL received from the image signal processor 840. The image signal processor 840 controls the image sensor 820 and the motor circuit 830. In addition, the image signal processor 840 may create YUV data YUV including a luminance component, a difference between the luminance component and a blue component and a difference between the luminance component and a red component, or may create compressed data, e.g., JPEG (Joint Photography Experts Group) data, based on the RGB data (RGB) received from the image sensor 820

The image signal processor 840 may be connected to a host/application 850 and may provide YUV data YUV or JPEG data to the host/application 850 based on a master clock MCLK. In addition, the image signal processor 840 may interface with the host/application 850 via an SPI (Serial Peripheral Interface) and/or an I2C (Inter Integrated Circuit).

As described above, the image sensor 820 may generate a target image based on a predetermined exposure target value, and the image signal processor 840 may generate a new exposure target value based on brightness information of the acquired target image to control the image sensor 820.

The above-described electronic device 800 may include, but is not in any way limited to, a cellular phone, a laptop computer, or a tablet PC. Any electronic device may be employed as the electronic device 800 as long as it can incorporate the image capturing device according to the exemplary embodiments of the inventive concept.

Figure 11:
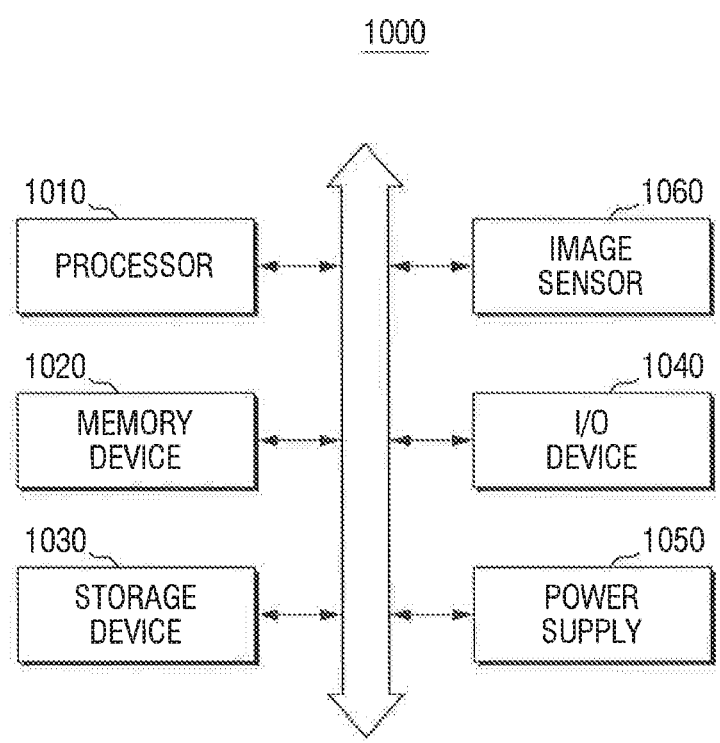
FIG. 11 is a block diagram of a computer system including an image capturing device according to an embodiment of the inventive concept.

FIG. 11 is a block diagram of an example of a computer system employing an image capturing device according to an embodiment of the inventive concept.

Referring now to FIG. 11, a computing system 1000 includes an image signal processor 1010, a memory device 1020, a storage device 1030, an I/O device 1040, a power supply 1050, and an image sensor 1060.

The image sensor 1060 may include an image sensor that uses the above-described, offset-compensated reference voltage as a reference voltage for ADC conversion. Although not shown in FIG. 11, the computing system 1000 may further include ports that support communications with a video card, a sound card, a memory card, a USB device or other electronic devices.

The image signal processor 1010 comprises hardware that may be configured with executable instructions to perform certain calculations or tasks. In some embodiments of the inventive concept, the image signal processor 1010 may be a micro-processor or a central processing unit (CPU) having integrated circuits.

The image signal processor 1010 may communicate with the memory device 1020, the storage device 1030 and the I/O device 1040 via an address bus, a control bus and a data bus.

In some embodiments of the inventive concept, the image signal processor 1010 may also be coupled to an expansion bus, such as a peripheral component interconnect (PCI) bus. The memory device 1020 may store data utilized for operation of the computing system 1000.

For example, the memory device 1020 may be implemented as a DRAM, a mobile DRAM, an SRAM, a PRAM, an FRAM, an RRAM, and/or an MRAM. The storage device 1030 may include a solid state drive (SSD), a hard disk drive (HDD), a CD-ROM, etc.

The I/O device 1040 may comprise an input device such as, for example, a keyboard, a keypad and a mouse, and an output device such as, for example, a printer and a display. The power supply 1050 may supply the operating voltage utilized for the operation of the electronic device 1000.

The image sensor 1060 may be connected to the processor 1010 via busses or other communication links to perform communications. As described above, the image sensor 1060 may generate a target image based on a predetermined exposure target value, and the image signal processor 1010 may generate a new exposure target value based on brightness information of the generated target image to control the image sensor 1060. The image sensor 1060 may be integrated into a single chip together with the image signal processor 1010, or may be integrated into another chip.

A person of ordinary skill in the art should understand and appreciate that that the computing system 1000 should be interpreted as any computing system that uses an image sensor. For example, the computing system 1000 may include a digital camera, a mobile phone, a smart phone, a tablet PC, etc.

The embodiments of the inventive concept have been described with reference to the attached drawings, but a person of ordinary skill in the art should understand and appreciate that the inventive concept may be practiced in other specific forms without changing the technical concept or attributes of the inventive concept. Further, the above-described embodiments are examples provided for illustrative purposes and do not limit the scope of the rights of the inventive concept.

What is claimed is:

1. An image capturing device comprising:
   an image sensor configured to generate a target image by converting an optical signal of an acquired image into an electrical signal;
   an image signal processor configured to:
   receive the target image generated by the image sensor,
     provide a predetermined first exposure target value to the image sensor, in which the generated target image is based on the predetermined first exposure target value, and
     generate a second exposure target value based on brightness information of the generated target image to control an output of the image sensor,
   wherein the image signal processor comprises:
     a histogram generation circuit configured to create a luma histogram based on the brightness information of the generated target image;
     a calculation circuit configured to calculate a distribution of the luma histogram; and
     an exposure target control circuit configured to generate the second exposure target value based on the distribution of the luma histogram to provide the second exposure target value to the image sensor,
   wherein the distribution of the luma histogram comprises normalized data of a variance of the luma histogram based on scene information of the target image, and
   wherein the exposure target control circuit compares the normalized data with a reference value to modify a brightness of the target image, and
   wherein the exposure target control circuit increases the first exposure target value to generate the second exposure target value if the normalized data is smaller than the reference value.

2. The image capturing device according to claim 1, wherein the scene information comprises an average brightness of the target image.

3. The image capturing device according to claim 1, wherein the image signal processor is configured to generate a feedback signal to the image sensor to control the image sensor by using the target image provided by the image sensor.

4. The image capturing device according to claim 1, wherein the image sensor generates another target image based on the second exposure target value, and
   wherein the normalized data of the variance of the luma histogram based on the scene information of the target image acquired by the first exposure target value is substantially identical to the normalized data of the variance of the luma histogram based on the scene information of the target image acquired by the second exposure target value.

5. The image capturing device according to claim 1, wherein scene information of the target image comprises a proportion of pixels exceeding a predetermined threshold, and
   wherein the image signal processor uses the proportion of pixels exceeding the predetermined threshold to control exposure of the image sensor.

6. The image capturing device according to claim 1, further comprising:
   a scene change detection circuit configured to determine whether there is a scene change in the target image,
   wherein the histogram generation circuit creates a histogram based on brightness information of a new target image if it is determined that there is a scene change,
   wherein the calculation circuit calculates a distribution of a new luma histogram, and
   wherein the exposure target control circuit creates a third exposure target value according to a distribution of the new luma histogram.

7. The image capturing device of claim 6, wherein the scene change sensing circuit determines whether there is a scene change based on a ratio of a brightness change of at least some areas of the target image with respect to a brightness change of an entire area of the target image.

8. A method of driving an image capturing device, the method comprising:
   generating a target image based on a predetermined first exposure target value;
   generating a luma histogram based on brightness information of the generated target image;
   calculating a distribution of the luma histogram, and generating a second exposure target value based on the distribution of the luma histogram to control an image sensor,
   wherein the distribution of the luma histogram comprises normalized data of a variance of the luma histogram based on scene information of the target image, and
   wherein an exposure target control circuit compares the normalized data with a reference value, and
   wherein the exposure target control circuit increases the exposure target value if the normalized data is smaller than the reference value.

9. The method according to claim 8, wherein the scene information comprises an average brightness of the target image.

10. The method according to claim 8, further comprising:
   determining whether there is a scene change in the target image;
   creating a histogram based on brightness information of a new target image if it is determined that there is a scene change in the target image;
   calculating a distribution of a new luma histogram; and
   creating a third exposure target value according to a distribution of the new luma histogram.

11. The method according to claim 10, wherein the determining comprises determining whether there is a scene change based on a ratio of a brightness change of one or more areas with respect to a brightness change of an entire area of the target image.

12. The method according to claim 8, wherein the generating of a target image includes an image sensor converting an optical signal of an acquired image into an electrical signal.

13. An image capturing device comprising:
   a lens that condenses incident light;
   an image sensor having a light-receiving region arranged to receive the incident light that passes through the lens, wherein the image sensor generates a first target image based on conversion of an optical signal of an acquired image into an electrical signal;
   a motor assembly configured to adjust a focus of the lens or perform shuttering in response to receiving a control signal, and
   an image signal processor configured to: receive the first target image generated by the image sensor, provide a predetermined first exposure target value to the image sensor, in which the generated first target image is based on the predetermined first exposure target value, and generate a second exposure target value based on brightness information of the generated first target image to control the image sensor,
   wherein the image signal processor comprises:
      a histogram generation circuit configured to create a luma histogram based on the brightness information of the generated target image;
      a calculation circuit configured to calculate a distribution of the luma histogram; and
      an exposure target control circuit configured to generate the second exposure target value based on the distribution of the luma histogram to provide the second exposure target value to the image sensor,
   wherein the distribution of the luma histogram comprises normalized data of a variance of the luma histogram based on scene information of the target image, and
   wherein the exposure target control circuit compares the normalized data with a reference value to modify a brightness of the target image,
   wherein the image sensor generates a second target image based on the second exposure target value; and
   wherein the normalized data of the variance of the luma histogram based on the scene information of the target image acquired by the first exposure target value is substantially identical to the normalized data of the variance of the luma histogram based on the scene information of the target image acquired by the second exposure target value.

14. The image capturing device according to claim 13, wherein the image signal processor further comprises:
   a histogram generation circuit configured to create a luma histogram based on the brightness information of the generated first target image;
   wherein a distribution of the luma histogram comprises normalized data of a variance of the luma histogram based on scene information of the first target image, and
   wherein an exposure target control circuit compares the normalized data with a reference value to modify a brightness of the first target image.

15. The image capturing device according to claim 14 wherein the image sensor creates Red Green Blue (RGB) data and a Bayer pattern based on the incident light that passes through the lens.

16. The image capturing device according to claim 15, wherein the image sensor provides RGB data based on a clock signal.

17. The image capturing device according to claim 14,
   wherein the scene information comprises an average brightness of the target image.

18. The image capturing device according to claim 14,
   wherein the exposure target control circuit increases the first exposure target value to generate the second exposure target value if the normalized data is smaller than the reference value.

19. The image capturing device of claim 14, further comprising:
   a scene change detection circuit configured to determine whether there is a scene change in the first target image,
   wherein the histogram generation circuit creates a histogram based on brightness information of a new target image if it is determined that there is a scene change,
   wherein the calculation circuit calculates a distribution of a new luma histogram,
   wherein the exposure target control circuit creates a third exposure target value according to a distribution of the new luma histogram, and
   wherein the scene change sensing circuit determines whether there is a scene change based on a ratio of a brightness change of at least some areas of the target image with respect to a brightness change of an entire area of the target image.

20. The image capturing device according to claim 13,
   wherein scene information of the first target image comprises a proportion of pixels exceeding a predetermined threshold, and
   wherein the image signal processor uses the proportion of pixels exceeding the predetermined threshold to control exposure of the image sensor.

* * * * *